(12) United States Patent
Eriksson et al.

(10) Patent No.: US 11,693,087 B2
(45) Date of Patent: Jul. 4, 2023

(54) PULSED RADAR LEVEL GAUGE WITH FEEDBACK OF TRANSMIT PULSE

(71) Applicant: Rosemount Tank Radar AB, Mölnlycke (SE)

(72) Inventors: Mikael Eriksson, Västervik (SE); Leif Nilsson, Linköping (SE); Håkan Nyberg, Linköping (SE)

(73) Assignee: ROSEMOUNT TANK RADAR AB, Mölnlycke (SE)

(*) Notice: Subject to any disclaimer, the term of this patent is extended or adjusted under 35 U.S.C. 154(b) by 194 days.

(21) Appl. No.: 17/022,275

(22) Filed: Sep. 16, 2020

(65) Prior Publication Data

US 2021/0088372 A1     Mar. 25, 2021

(30) Foreign Application Priority Data

Sep. 19, 2019  (EP) ................................. 19198458

(51) Int. Cl.
*G01F 23/284*     (2006.01)
*G01S 7/282*      (2006.01)
(Continued)

(52) U.S. Cl.
CPC .............. *G01S 7/282* (2013.01); *G01S 7/032* (2013.01); *G01S 7/285* (2013.01); *G01F 23/284* (2013.01); *G01S 7/03* (2013.01); *G01S 7/2806* (2013.01)

(58) Field of Classification Search
CPC ........ G01F 23/284; G01S 7/032; G01S 7/282; G01S 7/285; G01S 7/03; G01S 7/2806; G01S 13/103; G01S 13/88
See application file for complete search history.

(56) References Cited

U.S. PATENT DOCUMENTS 5,345,471 A     9/1994  McEwan
5,523,760 A *   6/1996  McEwan ................. G01S 13/04
                                                     375/130
(Continued)

FOREIGN PATENT DOCUMENTS

KR    10-2013-0045070    5/2013
WO    WO 2019/099301     5/2019
WO    WO 2020/126003     6/2020

OTHER PUBLICATIONS

European Search Report from European Patent Application No. EP 19198458.2, dated Mar. 23, 2020.
(Continued)

*Primary Examiner* — Timothy A Brainard
*Assistant Examiner* — Ismaaeel A. Siddiquee
(74) *Attorney, Agent, or Firm* — Westman, Champlin & Koehler, P.A.

(57) ABSTRACT

A pulsed radar level gauge comprising a pulse generator configured to generate a transmit signal ($S_T$) in the form of a pulse train, a propagation device connected to direct the transmit signal ($S_T$) into a tank and return a microwave return signal ($S_R$), a receiver, sampling circuitry configured to provide a time expanded tank signal, and processing circuitry for determining said filling level based on the time expanded tank signal. The gauge further comprises impedance increasing circuitry arranged to ensure that an input impedance of the receiver is at least 2 kΩ and a delay line arranged between said receiver and said propagation device, the delay line configured to introduce a delay greater than said pulse duration, such that said time expanded signal includes a transmitted pulse.

20 Claims, 8 Drawing Sheets

(51) Int. Cl.
*G01S 7/03* (2006.01)
*G01S 7/285* (2006.01)
*G01S 7/28* (2006.01)

(56) References Cited

U.S. PATENT DOCUMENTS

| | | | | |
|---|---|---|---|---|
| 5,609,059 | A | * | 3/1997 | McEwan ................ E05F 15/42 |
| | | | | 73/290 R |
| 5,656,774 | A | | 8/1997 | Nelson et al. |
| 5,774,091 | A | * | 6/1998 | McEwan ............ G01S 13/0218 |
| | | | | 342/126 |
| 6,801,157 | B2 | | 10/2004 | Haynes |
| 2001/0050629 | A1 | * | 12/2001 | Benway ................ G01S 13/88 |
| | | | | 342/204 |
| 2004/0066324 | A1 | * | 4/2004 | Haynes ................. G01S 13/88 |
| | | | | 342/124 |
| 2004/0085240 | A1 | | 5/2004 | Faust |
| 2005/0024259 | A1 | * | 2/2005 | Berry ..................... G01S 7/34 |
| | | | | 342/134 |
| 2006/0001567 | A1 | | 1/2006 | Nilsson |
| 2008/0074309 | A1 | | 3/2008 | Nilsson |
| 2009/0033543 | A1 | | 2/2009 | Nilsson et al. |
| 2009/0303106 | A1 | * | 12/2009 | Edvardsson ............ G01S 7/03 |
| | | | | 342/124 |
| 2014/0005959 | A1 | | 1/2014 | Nilsson et al. |
| 2016/0146924 | A1 | | 5/2016 | Williams |
| 2016/0262254 | A1 | | 9/2016 | Meijer |
| 2016/0266240 | A1 | | 9/2016 | Hughes et al. |
| 2018/0094964 | A1 | * | 4/2018 | Eriksson ................ H03L 7/18 |

OTHER PUBLICATIONS

AN9003—A Users Guide to Intrinsic Safety, Cooper Crouse-Hinds, Retrieved Sep. 25, 2012, 20 pgs.
Extended European Search Report from European Application No. 19179520.2, dated Nov. 27, 2019.
Communication Under Rule 71(3) EPC from European Patent Application No. 19198458.2, dated Jan. 19, 2023.

* cited by examiner

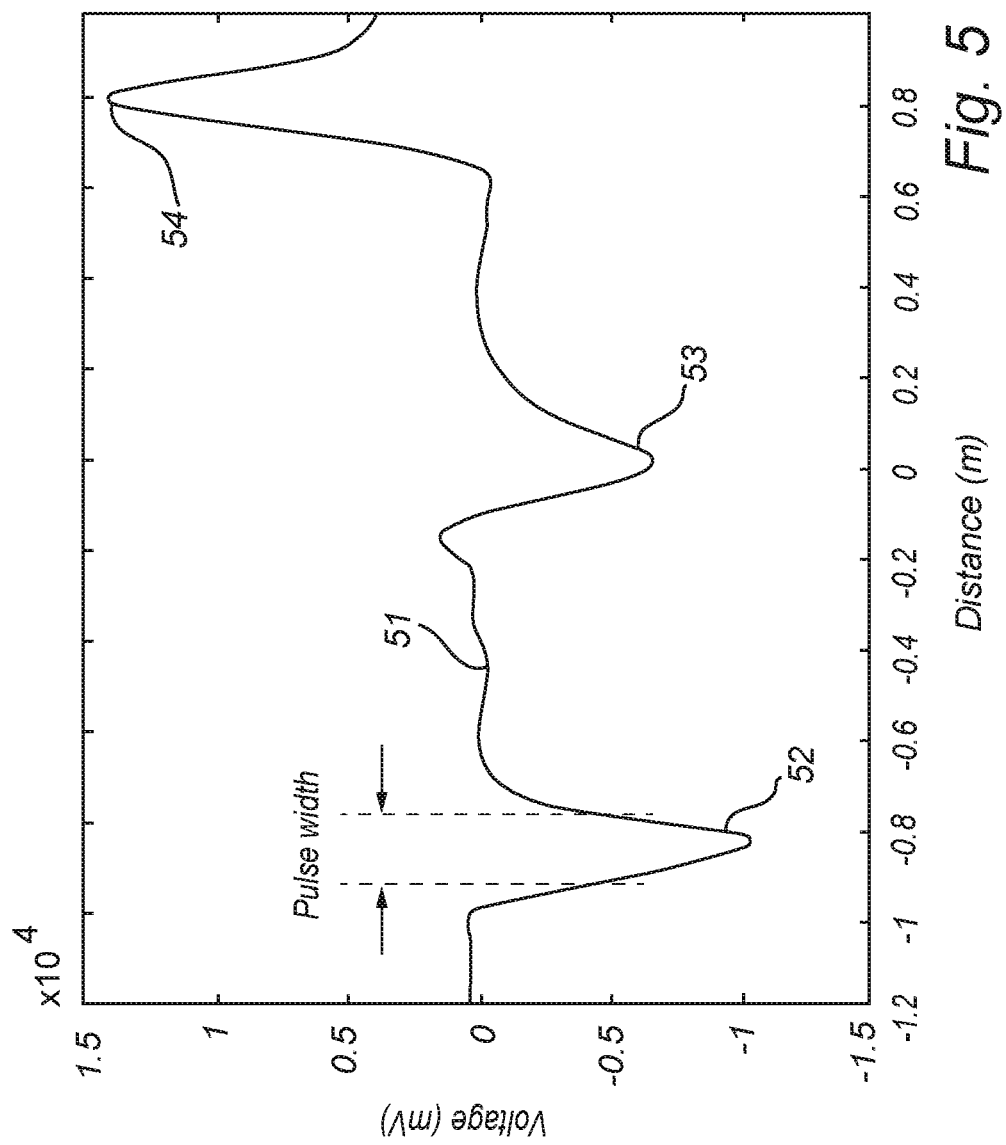

US 11,693,087 B2

PULSED RADAR LEVEL GAUGE WITH FEEDBACK OF TRANSMIT PULSE

CROSS-REFERENCE TO RELATED APPLICATION

This application claims priority to European Patent Application No. 19198458.2, filed on Sep. 19, 2019, the content of which is hereby incorporated by reference in its entirety.

FIELD OF THE INVENTION

The present invention relates to a pulsed radar level gauge comprising a frequency generator for generating a Tx frequency signal and a Rx frequency signal, a pulse generator connected to the frequency generator and configured to generate a transmit signal in the form of a pulse train having a pulse repetition frequency equal to the Tx frequency and a pulse duration, a propagation device connected to the pulse generator and configured to direct the microwave transmit signal into the tank towards the product and return a microwave return signal resulting from a reflection caused by a surface of the product, a receiver connected to the propagation device and configured to receive the microwave return signal $S_R$ reflected from the tank, sampling circuitry connected to the receiver and to the frequency generator, and configured to sample the received signal with a sampling frequency equal to the Rx frequency in order to provide a time expanded tank signal including a fiducial pulse and a surface echo, and processing circuitry for determining the filling level based on the time expanded tank signal.

BACKGROUND OF THE INVENTION

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. The probe is generally arranged to extend vertically from the top towards the bottom of the tank. The probe may also be arranged in a measurement tube, a so-called chamber, which is connected to the outer wall of the tank and is in fluid connection with the inside of the tank.

The transmitted electromagnetic signals are reflected at the surface of the product, and the reflected signals are received by a receiver or transceiver comprised in the radar level gauge system. Based on the transmitted and reflected signals, the distance to the surface of the product can be determined.

The distance to the surface of the product is generally determined based on the time between transmission of an electromagnetic signal and reception of the reflection thereof in the interface between the atmosphere in the tank and the product contained therein. In order to determine the actual filling level of the product, the distance from a reference position to the surface is determined based on the above-mentioned time and the propagation velocity of the electromagnetic signals.

Most radar level gauge systems on the market today are either so-called pulsed radar level gauge systems that determine the distance to the surface of the product contained in the tank based on the difference in time between transmission of a pulse and reception of its reflection at the surface of the product, or systems that determine the distance to the surface based on the phase difference between a transmitted frequency-modulated signal and its reflection at the surface. The former type of systems is generally referred to as time domain reflectometry (TDR) systems, and an example is provided in U.S. Pat. No. 6,801,157. The latter type of systems is generally referred to as FMCW (Frequency Modulated Continuous Wave) systems.

In some applications, an RLG is used in a hazardous environment, e.g. in connection to a tank with flammable and explosive gases and liquids. In such applications, the RLG must be designed to avoid igniting explosions.

For a non-contact RLG, i.e. an RLG emitting electromagnetic signals by means of a directional antenna, the RLG may be separated from the tank interior by a microwave window. For such RLGs, it may therefore be sufficient to place the RLG in an explosion proof housing (referred to as an Ex-d housing). For guided wave radar (GWR), however, where the probe extends into the tank interior, explosion proof is not sufficient, and GWR level gauges are therefore typically designed to be intrinsically safe. When circuitry is "intrinsically safe" the available electrical and thermal energy in the circuitry is restricted such that ignition of a hazardous atmosphere (explosive gas or dust) cannot occur, even under worst case conditions. For details of the IS concept, reference is made to "AN9003-*A Users Guide to Intrinsic Safety*", Cooper Crouse Hinds, Retrieved 25 Sep. 2012. Examples of norms for intrinsic safety are IEC 610079-0 and IEC 610079-11.

In some applications, an explosion proof housing needs to be provided with an intrinsically safe output (IS output). One straightforward approach to such a design is to have the circuitry in the housing grounded to the housing ground. However, there are advantages to having the circuitry in the housing connected to a "floating" ground, i.e. ground potential which is independent of the housing ground. This requires blocking any DC components caused by differences in ground potential. One issue with such a solution is reception of signals while still maintaining a satisfactory signal-to-noise ratio, and complying with electromagnetic compatibility (EMC) requirements.

One challenge with such systems is that the shape of the transmitted pulse (e.g. amplitude, width, rise time, fall time) is affected by varying factors such as ambient temperature and spread in component performance. For example, the pulse width may change as much as +/−10% in a relevant temperature range.

General Disclosure of the Invention

It is an object of the present invention to mitigate the above problems, and provide a more reliable and robust level measurement over the relevant temperature range.

According to a first aspect of the invention, this and other objects is achieved by a pulsed level gauge for determining a filling level of product in a tank, comprising a frequency generator for generating a Tx frequency signal and a Rx frequency signal, a pulse generator connected to the frequency generator and configured to generate a transmit signal in the form of a pulse train having a pulse repetition frequency equal to the Tx frequency, and a pulse duration, a propagation device connected to the pulse generator and configured to direct the microwave transmit signal into the tank towards the product and return a microwave return signal resulting from a reflection caused by a surface of the product, a receiver connected to the propagation device and configured to receive the microwave return signal $S_R$ reflected from the tank, sampling circuitry connected to the receiver and to the frequency generator, and configured to sample the received signal with a sampling frequency equal to the Rx frequency in order to provide a time expanded tank signal including a fiducial pulse and a surface echo, and processing circuitry for determining the filling level based on the time expanded tank signal. The gauge further includes impedance increasing circuitry arranged to ensure that an input impedance of the receiver provides matching to the propagation device such that a detectable portion of the transmit pulse is received by the receiver, and a delay line arranged between the receiver and the propagation device, the delay line being configured to introduce a delay greater than the pulse duration such that the time expanded signal includes a transmitted pulse in addition to the fiducial pulse and the surface echo.

By means of the present invention, information about the transmitted pulse may be deduced from the tank signal, for use in the level detection process. For example, the shape of the transmitted pulse (width, amplitude, etc) may be used to infer how the transmitted pulse has been affected by environmental parameters such as temperature. The processing of the fiducial pulse and the surface echo may then be compensated based on this information.

Detection of the transmitted pulse is made possible by two features of the invention. First, the input impedance of the receiver is matched to the impedance of the propagation device, so as to avoid a strong transition reflection. Hereby, a sufficiently large portion of the transmit pulse energy will be received by the receiver to enable detection. Second, a delay line is provided between the receiver and the propagation device, such that the fiducial pulse (and the subsequent surface echo) are separated from the transmit pulse in the time expanded tank signal.

In one embodiment, the pulse generator is configured to generate pulses with adjustable pulse duration, and the processing circuitry is configured to determine a width of the transmitted pulse in the tank signal and apply feedback control of the adjustable pulse duration. Such feedback control in a system including a pulse generator with adjustable pulse width enables a more precise pulse width control, providing considerable advantages compared to pulse width control without feedback.

A setpoint value of such feedback control may be determined based on one or several measured environmental parameters.

The receiver may be a differential receiver having a first terminal connected to said propagation device, and a second terminal connected to ground potential, a voltage between the first and second terminals forming an input signal to the differential receiver. In this case, the impedance increasing circuitry may include a first impedance increasing circuit connected to increase an input impedance of the first terminal, and a second impedance increasing circuit connected to increase an input impedance of the second terminal.

The level gauge may be a so called guided wave radar (GWR) level gauge, in which case the propagation device is a transmission line probe extending into the tank and into the product, and wherein the reflection is caused by an impedance transition where the transmission line passes the product surface. Alternatively, the level gauge is a non-contact radar (NCR) level gauge, in which case the propagation device is a directional antenna mounted in the top of the tank and directed towards the surface.

In some applications, the RLG circuitry is incompatible with intrinsic safety requirements, and the gauge may then comprise an electrical barrier connected between the RLG circuitry and the microwave circuitry, the electrical barrier preventing energy or voltages incompatible with IS requirements from reaching the microwave unit. Such an electrical barrier, arranged between non-IS circuitry and IS circuitry, is referred to as an IS-barrier, and serves to "clamp" the individual signals with respect to voltage and current. A conventional IS-barrier involves fuses to protect from significant power surges, Zener diodes (typically three in parallel) to limit the voltage, and resistors to limit the current. It is noted that the IS-barrier is incapable of handling the high frequency signals (e.g. in the GHz area) transmitted and received by the pulse generator and receiver, and therefore must be placed upstream this circuitry.

BRIEF DESCRIPTION OF THE DRAWINGS

The present invention will be described in more detail with reference to the appended drawings, showing currently preferred embodiments of the invention.

FIG. 5 is a diagram of a time expanded tank signal according to an embodiment of the present invention.

DETAILED DESCRIPTION OF PREFERRED EMBODIMENTS

An embodiment of the present invention will now be disclosed with reference to a pulsed radar level gauge. In the context of radar level gauging, a pulsed system determines the distance to the surface of the product contained in the tank based on the difference in time (time-of-flight) between transmission of a pulse and reception of its reflection at the surface of the product. Most pulsed radar level gauge systems employ Time Domain Reflectometry (TDR), which provides a time expansion of the (extremely short) time-of-flight. Such TDR radar level gauge systems generate a transmit pulse train having a first pulse repetition frequency Tx, and a reference pulse train having a second pulse repetition frequency Rx that differs from the transmitted pulse repetition frequency by a known frequency difference Δf. This frequency difference Δf is typically in the range of Hz or tens of Hz.

The transmit pulse train is emitted by a propagating device towards the surface of a product contained in a tank, and the reflected signal is received and sampled with the reference pulse train. In the present disclosure, the propagation device is a transmission line probe, and the gauge is referred to as a "guided wave radar" (GWR) level gauge.

At the beginning of a measurement sweep, the transmission signal and the reference signal are synchronized to have the same phase. Due to the frequency difference, the phase difference between the transmission signal and the reference signal will gradually increase during the measurement sweep. This gradually shifting time sampling of the reflected signal will provide a time expanded version of the time-of-flight of the reflected pulses, from which the distance to the surface of the product contained in the tank can be determined.

Figure 1:
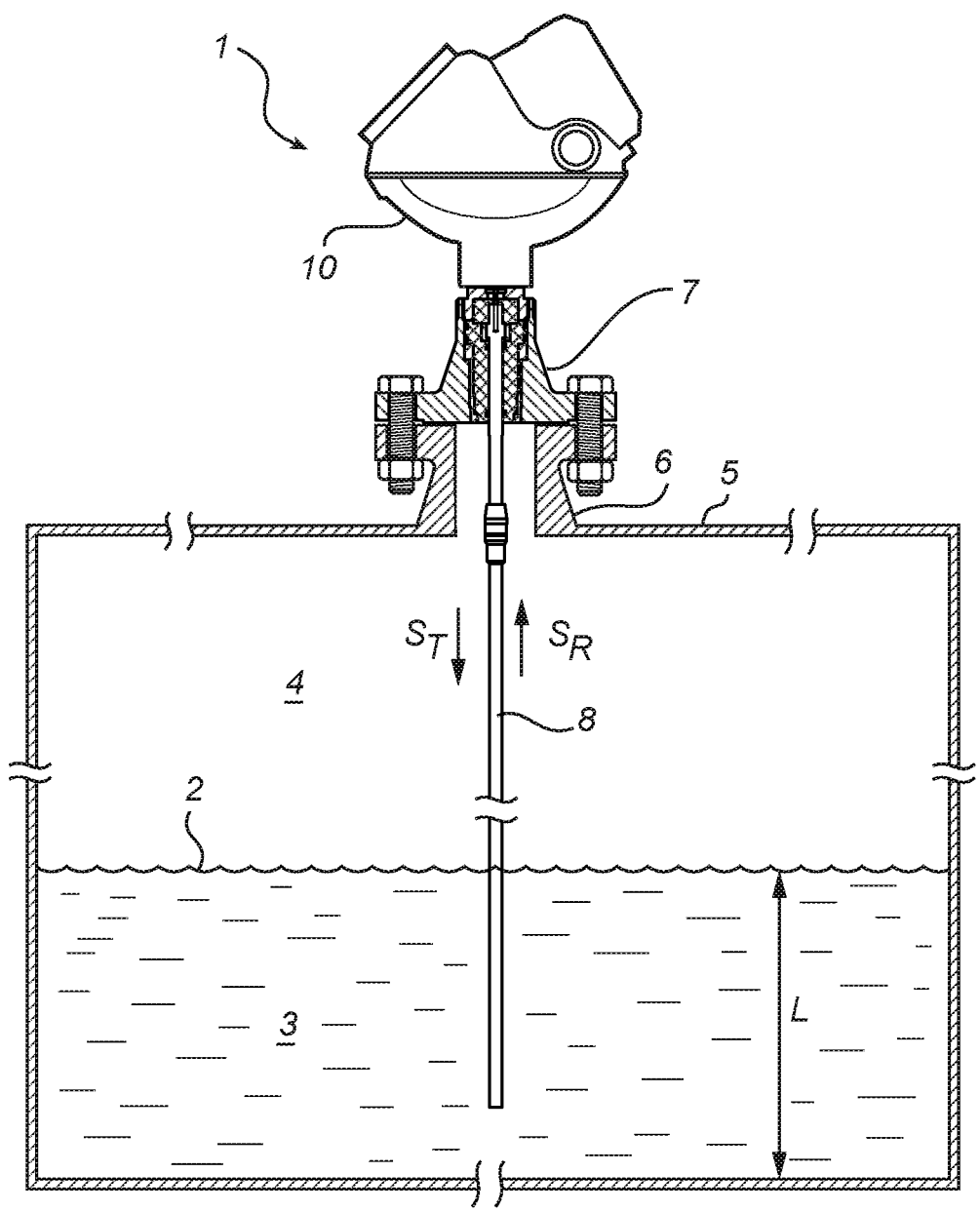
FIG. 1 shows schematically a guided wave radar level gauge.

FIG. 1 shows schematically a guided wave pulsed radar level gauge (RLG) 1 arranged to measure a distance to an interface 2 between two (or more) materials 3, 4 in the tank 5. Typically, the first material 3 is a product stored in the tank, e.g. a liquid such as gasoline, while the second material 4 is air or some other atmosphere. In that case, the RLG will enable detection of the distance to the surface 2 of the content 3 in the tank, and from this determine the filling level L.

The tank 5 is provided with a fastening structure 6 securing the RLG 1 in a measuring position fixed relative the bottom of the tank 5. The RLG 1 includes a feed through structure 7, allowing transmission of signals into and out of the tank. The feed through structure 7 may be arranged to provide process seal, capable of withstanding temperature, pressure, and any chemicals contained in the tank.

The RLG 1 further comprises a propagation device arranged to allow propagation of the transmit signal $S_T$ towards the surface 2, and to return a reflected signal $S_R$ resulting from a reflection of the transmit signal at a surface 2 of the product 3. In the illustrated case, the propagation device is a transmission line probe 8, but it may alternatively be a directional antenna.

The probe 8 (or antenna) is connected to the transceiver (see FIG. 2) via the feed through structure 7 and extends from the RLG 1 to the bottom of the tank 5. Electromagnetic waves transmitted along the probe 8 will be reflected by any interface 2 between materials in the tank, and the reflection will be transmitted back to the transceiver via the feed through structure 7. The probe can be e.g. a coaxial wire probe, a twin wire probe, or a single wire probe (also referred to as a surface wave guide).

Figure 2:
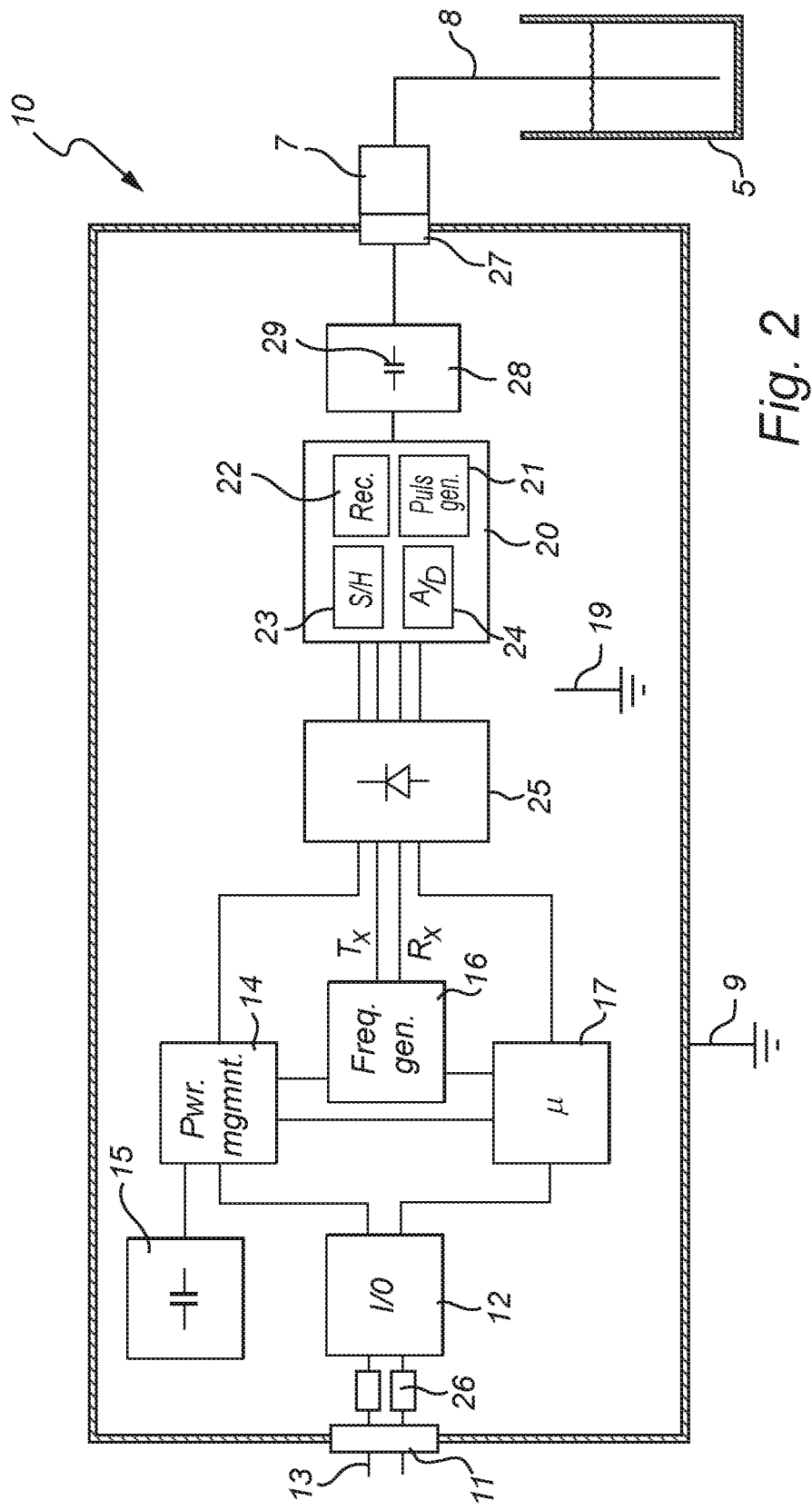
FIG. 2 shows a block diagram of the circuitry and floating IS barrier in the explosion proof housing of the gauge in FIG. 1.

A housing 10 is secured to the feed through structure 7, and houses the electrical components of the RLG 1. The housing 10 is here designed to fulfill the requirements for "explosion proof" enclosure, e.g. as specified in IEC 60079-1. With reference to FIG. 2, the circuitry enclosed in the housing 10 will be described in more detail.

The housing 10 is connected to a housing ground potential 9. A first (explosion proof) signal passage 11 provides external access to a signal/power circuitry 12 which is configured to receive operating power and allow communicating measurement data externally of the RLG 1. In the illustrated example, the signal passage 11 and signal/power circuitry 12 provide a two-wire interface, and may be connected e.g. to a 4-20 mA control loop 13. The current in the loop may correspond to an analogue measurement value (e.g. indicating the filling level L). Alternatively, digital data may be sent across the two-wire loop, using an appropriate protocol such as HART.

The interface 11, 12 is connected to a power management circuitry 14 which is configured to receive and distribute power to the circuitry in the housing 10. The power management circuitry may be connected to an energy store 15, e.g. a capacitance, configured to store energy such that power exceeding the power available from the interface 11, 12, may intermittently be made available. This is particularly useful when using a two-wire control loop with limited current. The power management circuitry 14 may then "scavenge" available power that is not required for immediate operation, and store it in the energy store 15. This stored energy may then be used during a measurement sweep.

The housing 10 further encloses a frequency generator 16 for generating a Tx frequency pulse train and an Rx frequency pulse train. As an example, suitable Tx and Rx frequencies are in the range 0.5-10 MHz, typically 1-2 MHz. Tx is typically greater than Rx, although the opposite relationship is also possible. A critical aspect is the difference between the TX and Rx frequencies, which needs to be several orders of magnitude smaller than the Tx and Rx frequencies. As an example, the difference frequency is in the order of Hz, smaller than 15 Hz, although a larger difference frequency may also be compatible with the technology.

The housing further encloses processing circuitry 17 for determining the distance based on the digital TDR signal. The circuitry 17 is provided with software for analyzing the TDR signal in order to determine a process variable in the tank, typically the level L of the surface 2. The processing circuitry may include a microprocessor (MCU), a FLASH memory for storing program code, a ROM (e.g. an EEPROM) for storing pre-programmed parameters, and a RAM for storing variable parameters.

To the right in FIG. 2 is a high frequency (HF) unit 20, comprising various circuitry for generating, transmitting and receiving microwave signals, and also for sampling the return signal to obtain a time expanded TDR signal. The HF unit 20 is connected to a second (explosion proof) signal passage, serving as an output 27 to which the probe 8 is connected via the tank feedthrough 7.

More specifically, the HF unit includes a transceiver circuitry including a pulse generator 21 configured to generate a transmit signal in the form of a pulse train having a pulse repetition frequency equal to the Tx frequency. The pulses may be DC pulses or be modulated by a carrier frequency. The carrier frequency may be in the order of GHz, e.g. 16 GHz or 25 GHz. The duration (width) of the pulses may be in the order of ns, e.g. around two ns or less, e.g. 1 ns or 0.5 ns, in order to enable measurement of the relatively short distance between the gauge 1 and the surface 2. The pulses may have average power levels in the order of mW or μW.

The transceiver circuitry also includes a receiver 22, configured to receive the reflected return signal $S_R$, and sampling circuitry 23, configured to sample the return signal $S_R$ with a sampling frequency equal to the Rx frequency in order to provide a time expanded tank signal, also referred to as a time domain reflectometry (TDR) signal.

The transceiver circuitry further includes a coupling device (not shown) allowing the transceiver to transmit the transmit signal to the probe 8 while simultaneously receiving the reflected signal from the probe 8. The coupling device may be some sort of directional coupler, a circulator, or a solid state switch.

The HF unit 20 here also includes an A/D converter 24 to A/D-convert a TDR signal into the digital TDR signal which is to be processed by the circuitry 17.

The output 27, which is electrically connected to the probe 8 extending into the tank 5, may in some applications need to be intrinsically safe (IS). In such cases, and when the RLG circuitry does not fulfill the IS requirements (e.g. because it includes an energy store 15 configured to store energy provided by the power management circuitry 14) an electric barrier 25 may be arranged between the RLG circuitry 14, 16, 17 and the HF unit 20, such that all electric signals between the RLG circuitry 14, 16, 17 and HF unit 20 are connected through the barrier 25. The barrier 25 is configured to "clamp" the individual signals with respect to voltage and current, such that the signals provided to the HF unit 20 comply with relevant requirements for intrinsic safety. For example, the barrier may ensure that the signals comply with the Ex-ia requirements. The barrier design may be known per se, and may include (for each signal connected though the barrier) fuses to protect from significant power surges, Zener diodes to limit the voltage, and resistors to limit the current. Optionally, the fuses 26 are not necessarily provided in the barrier 25, but may be located immediately inside the first signal passage 11, as shown in FIG. 2.

The barrier 25 in the illustrated embodiment is not grounded, i.e. not connected to the housing ground potential 9. The barrier is therefore referred to as a "floating" barrier, in the sense that barrier ground potential 19 is floating with respect to the housing ground potential 9. As a consequence, variation between barrier ground potential 19 and probe potential may cause DC components in the voltage between the HF unit 20 and the probe 8.

For this reason, a DC blocking arrangement 28 is arranged between the HF unit 20 and the IS output 27. The DC blocking arrangement 28 includes one or several blocking capacitors 29, serving to block any DC components in the signal provided to the probe 8. This DC blocking arrangements will complement the clamping by the barrier 25, by blocking DC and low frequency signals, e.g. originating from the power supply (for example U=250 V, f<60 Hz).

It is noted that an IS output of an explosion proof housing, using a floating ground IS barrier, is disclosed in co-pending (and presently non-published) patent application PCT/EP2018/086257, hereby incorporated by reference.

Figure 3A:
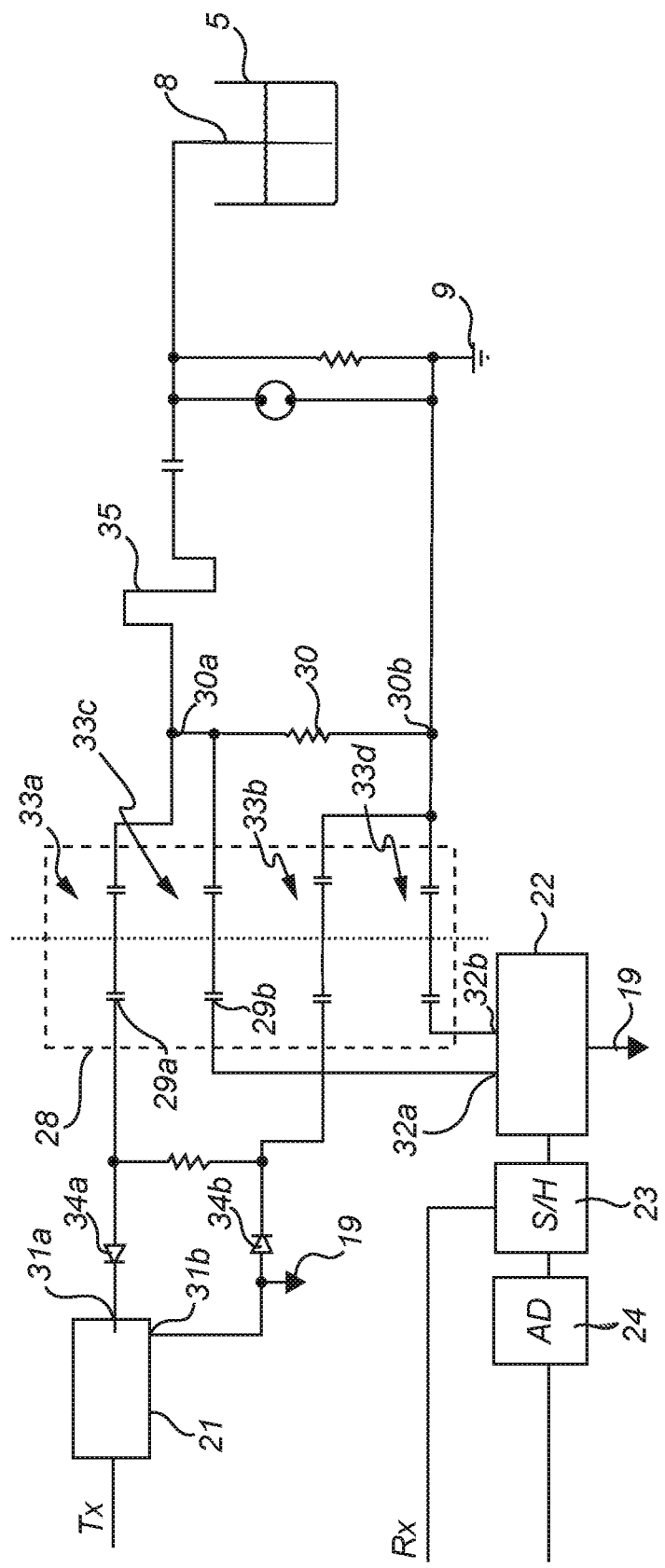
FIGS. 3a and 3b show schematic circuit diagrams of the microwave unit in FIG. 2, according to two embodiments of the invention.

One embodiment of the circuitry in the microwave unit 20, including a differential receiver 22, is shown in more detail in FIG. 3a.

The pulse generator 21 has two output terminals 31a, 31b. The first terminal 31a is electrically connected to the IS output 27 via the set of blocking capacitors 28, while the second terminal 31b is connected to the housing ground potential 9 via the set of blocking capacitors 28. The pulse generator 21 is also connected to the floating barrier ground potential 19. A delay line 35 is connected between the probe and the first terminal 30a of the resistor 30 (connected to the IS output 27). The delay line 35 is configured to introduce a delay greater than the duration of the emitted pulses, i.e. in the order of a few nanoseconds. As a rule of thumb, the introduced delay may be around 10% greater than the pulse duration. As an example, the pulse duration may be 1-1.5 ns, and the delay of the delay line 35 may be around 1.7 ns.

The differential receiver 22 has two input terminals 32a, 32b. The first terminal 32a is electrically connected to the IS output 27 via the set of blocking capacitors 28, while the second terminal 32b is connected to the housing ground potential 9 via the set of blocking capacitors 28. The voltage between the two terminals forms the input signal to the receiver 22. The receiver 22 is also connected to the floating barrier ground potential 19.

As discussed above, the set of blocking capacitors 28 forms a boundary between barrier ground potential 19 and housing ground potential 9. In the illustrated embodiment, the set of blocking capacitors 28 comprises four pairs 33a, 33b, 33c, 33d of capacitors. Specifically, a first pair of blocking capacitors 33a is connected in series between the first terminal 31a of the pulse generator and the first terminal 30a of the resistor 30 (connected to the IS output 27), a second pair of blocking capacitors 33b is connected in series between the second terminal 31b of the pulse generator and the second terminal 30b of the resistor 30 (connected to the housing ground potential 9), a third pair of blocking capacitors 33c is connected in series between the first terminal 32a of the differential receiver and the first terminal 30a of the resistor 30, and a fourth pair of blocking capacitors 33d is connected in series between the second terminal 32b of the differential receiver and the second terminal 30b of the resistor 30.

The required capacitance of each pair of blocking capacitors will depend on the input impedance of the respective terminal. As an example, the pulse generator 21 may have an input impedance of around 500 Ohm (including diodes 34a and 34b), and an appropriate capacitance "facing" the pulse generator may be around 100 pF (i.e. two 200 pF blocking capacitors 29a in series). As will be discussed in the following, the differential receiver 22 may have an even higher input impedance, and an appropriate capacitance "facing" the pulse generator may be around 20 pF (i.e. two 40 pF blocking capacitors 29b in series).

Figure 4A:
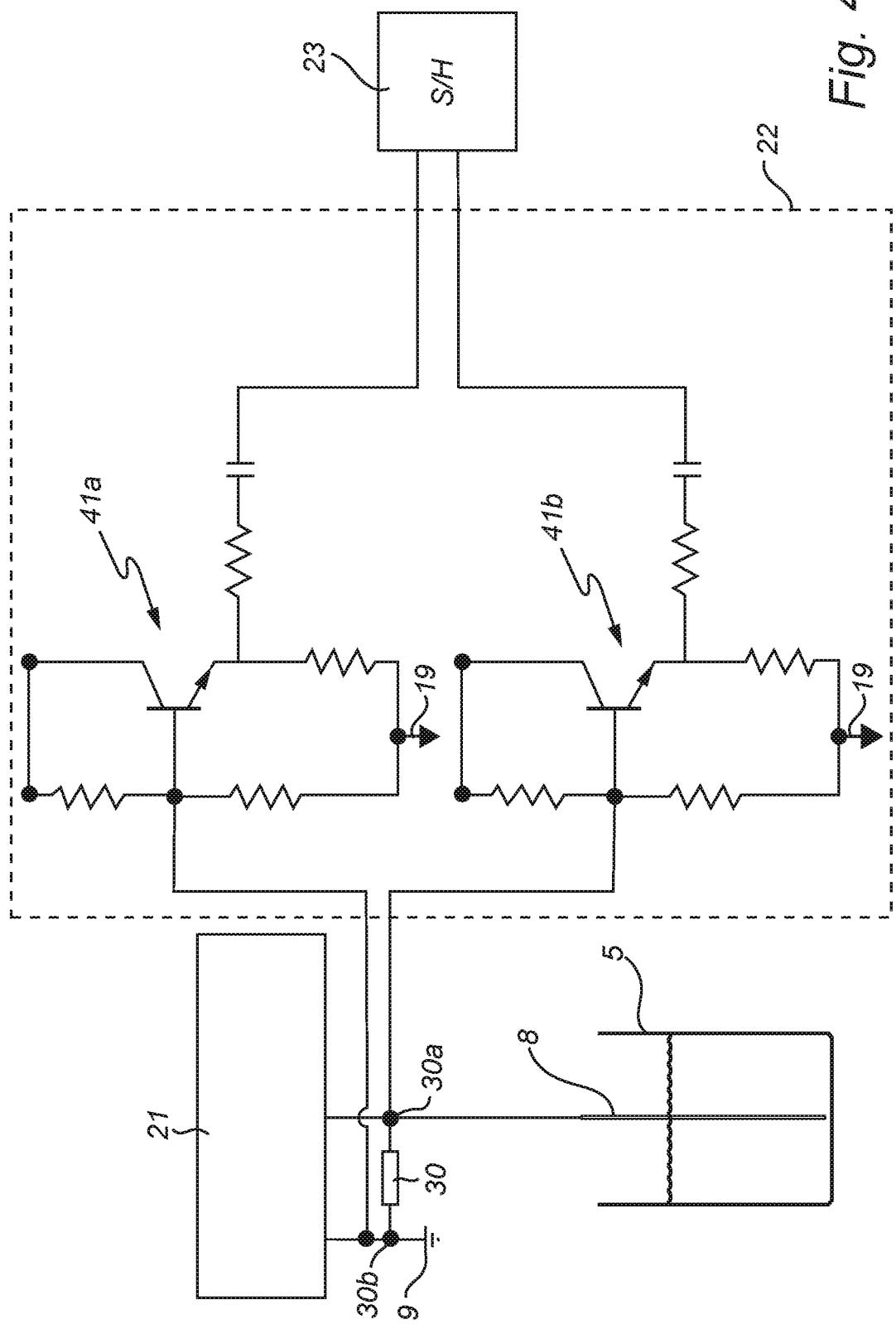
FIGS. 4a and 4b show connection of impedance increasing circuitry according to an embodiment of the invention.

The differential receiver 22 in FIG. 3a and its connections are shown in more detail in FIG. 4a (where the blocking capacitors have been omitted). In the illustrated example, the receiver 22 includes a first impedance increasing circuit 41a connected between the first terminal 32a of the differential receiver 22 and the third pair of blocking capacitors 33c, and a second impedance increasing circuit 41b connected between the second terminal 32b of the differential receiver 22 and the fourth pair of blocking capacitors 33d. The impedance increasing circuits 41a, 41b are connected to the sampling circuitry 23, which is here a differential sample and hold circuit.

The impedance increasing circuits 41a, 41b in FIG. 4a are so called emitter-followers, known in the art. Other circuits may also be used, such as Darlington, MOS, etc. By means of the impedance increasing circuits 41a, 41b, the input impedance of the receiver is matched to the impedance of the propagation device (e.g. probe or antenna). The matching should be such that the transmit pulse is detectable by the receiver 22. In other words, a sufficient portion of the transmit pulse energy should reach the receiver. As one example, based on an embodiment where the propagation device is a probe, and the resistor 30 is around 50 Ohm, the impedance (taken as the absolute value of a complex impedance) of the receiver of around 2 kΩ or more may be suitable, for example around 10 kOhm.

Figure 3B:
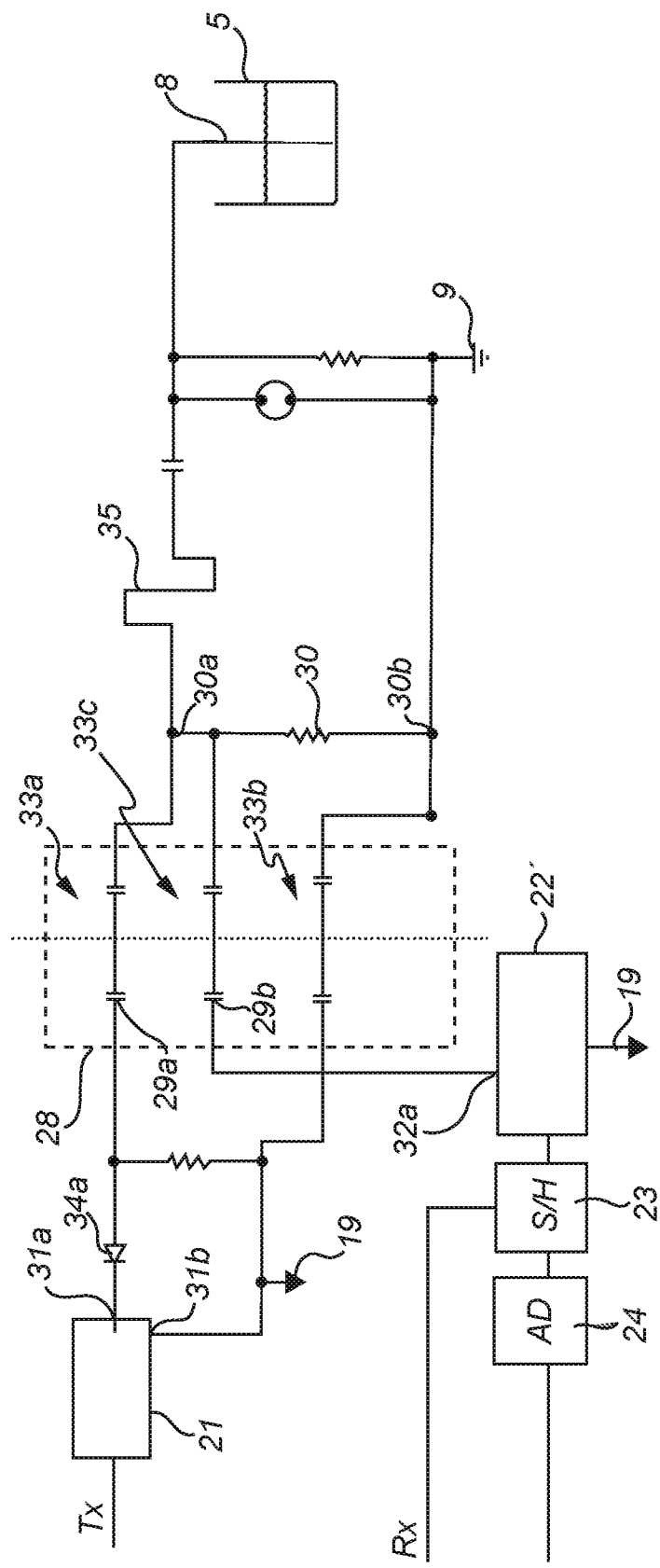

Another embodiment of the circuitry in the microwave unit 20, including a single (common) mode receiver 22', is shown in more detail in FIG. 3b. In FIG. 3b, elements corresponding to those in FIG. 3a have been given identical reference numbers and will not be described again.

The receiver 22' here has only one input 32, and the fourth pair of capacitors 33d is therefore omitted. The diode 34b is also not required in this case.

Figure 4B:
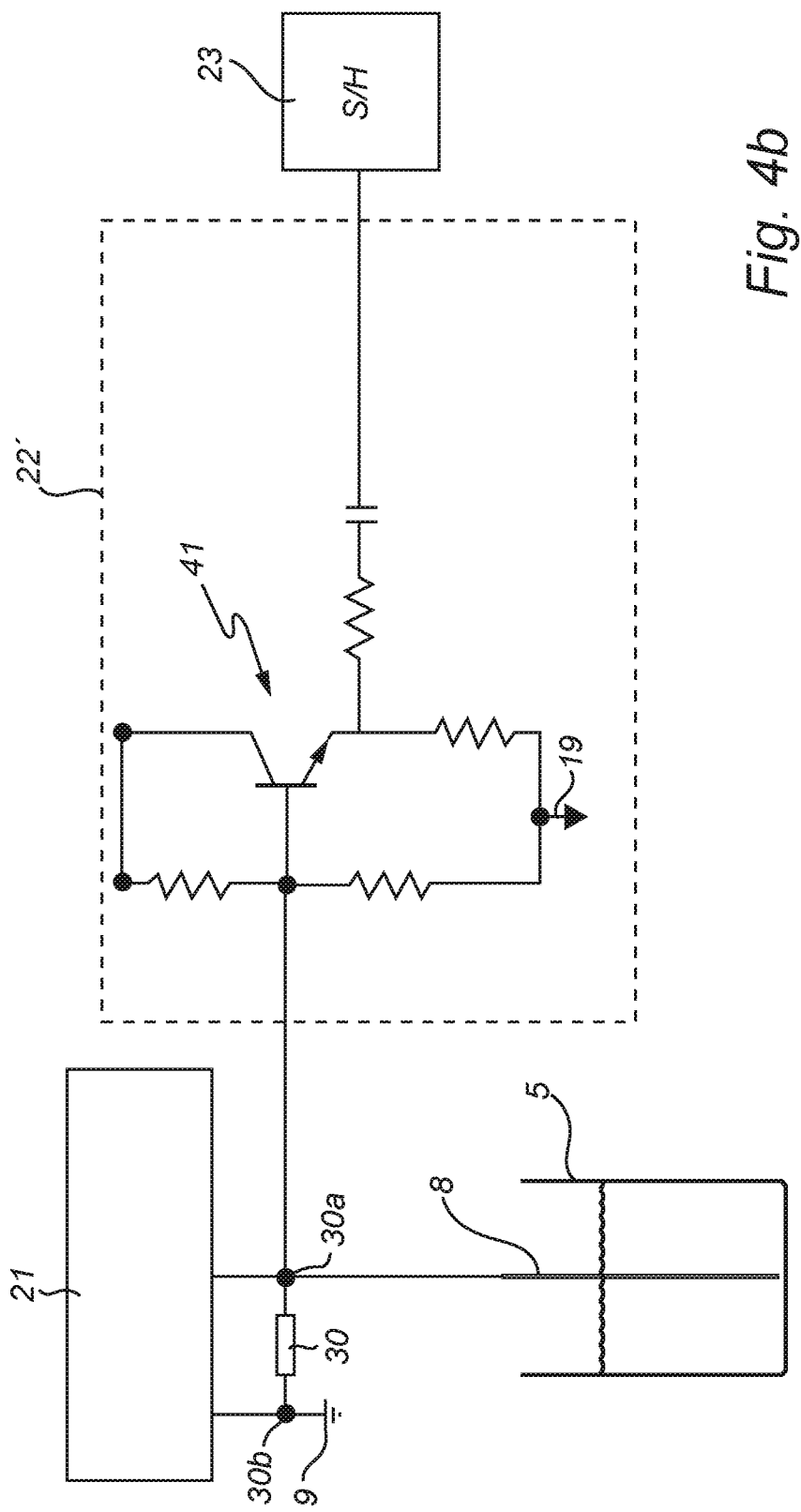

The single mode receiver 22' in FIG. 3b and its connections is shown in more detail in FIG. 4b. In the illustrated example, the receiver 22' includes an impedance increasing circuit 41 connected between the input terminal 32 of the receiver 22. and the third pair of blocking capacitors 33c. The impedance circuit 41 may be identical to the impedance circuits 41a, 41b in FIG. 4a described above.

In operation, the delay introduced by the delay line 35, and the increased impedance of the receiver, will ensure that the transmitted pulse is also present in the time expanded tank signal (TDR signal). An example of such a tank signal is shown in FIG. 5, labeled 51. As apparent from FIG. 5, the tank signal 51 includes a first, negative pulse 52, representing the transmitted pulse, a second, negative pulse 53, representing a fiducial pulse caused by the impedance transition in the tank feedthrough, and a third, positive pulse 54, representing a surface echo.

The processing circuitry 17 is configured to detect the pulse 52 representing the transmitted pulse, and use information about this pulse 52 in the level detection.

For example, the shape of the pulse 52 (width, amplitude, etc) may be used to infer how the pulse 52 has been affected by environmental parameters such as temperature. The processing of the pulses 53 and 54 may then be compensated based on this information.

Figure 6:
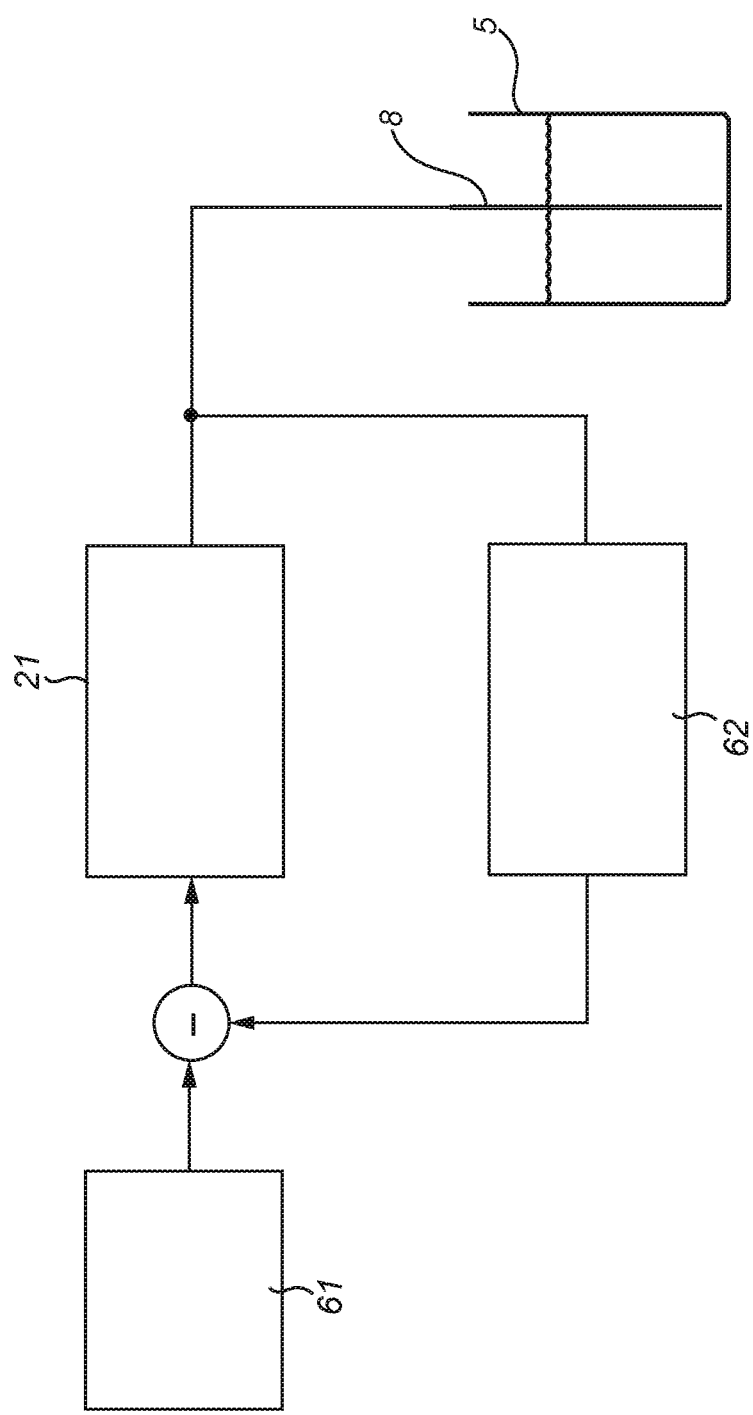
FIG. 6 is a schematic block diagram of a radar level gauge with feedback pulse width control.

The pulse 52 may also be used as feedback in a system with variable pulse width (duration), as schematically illustrated in FIG. 6. Here, environmental parameters such as temperature are detected by a sensor 61, and used to determine a suitable pulse width set point. The actual transmitted pulse width is determined from the tank signal in block 62 and used as feedback to a summation point 63. The output from the summation point 63 (error signal) is provided as input to the pulse generator 21. In the radar level gauge described above, this input may be one of the signals communicated thorough the barrier 25. The feedback control illustrated in FIG. 6 may be implemented by the processing circuitry 17.

The person skilled in the art realizes that the present invention by no means is limited to the preferred embodiments described above. On the contrary, many modifications and variations are possible within the scope of the appended claims. For example, the invention is not limited to applications with an explosion proof housing nor a floating ground as discussed above. If the radar level gauge does not have a "floating ground", all circuitry will have the same ground reference (housing ground), and the blocking capacitors will not be required.

What is claimed is:

1. A pulsed level gauge for determining a filling level of product in a tank, said level gauge comprising:
    a frequency generator for generating a Tx frequency signal and a Rx frequency signal;
    a pulse generator connected to said frequency generator and configured to generate a transmit signal in the form of a pulse train having a pulse repetition frequency equal to said Tx frequency, and a pulse duration;
    a propagation device connected to said pulse generator and configured to direct said microwave transmit signal, $S_T$, into said tank towards said product and return a microwave return signal, $S_R$, resulting from a reflection caused by a surface of said product;
    a receiver connected to said propagation device and configured to receive the microwave return signal $S_R$ reflected from the tank;
    sampling circuitry connected to the receiver and to the frequency generator, and configured to sample the received signal with a sampling frequency equal to the Rx frequency in order to provide a time expanded tank signal including a fiducial pulse and a surface echo; and
    processing circuitry for determining said filling level based on the time expanded tank signal,
        impedance increasing circuitry arranged to ensure that an input impedance of the receiver provides matching to said propagation device such that a detectable portion of the transmit pulse is received by the receiver; and
    a delay line arranged between said receiver and said propagation device, said delay line configured to introduce a delay greater than said pulse duration,
    such that said time expanded signal includes a transmitted pulse in addition to the fiducial pulse and the surface echo, wherein the processing circuitry is configured to detect the transmitted pulse, and use information about the transmitted pulse in the level detection, wherein processing of the fiducial pulse and the surface echo are compensated based on this information.

2. The radar level gauge according to claim 1, wherein said impedance increasing circuitry is arranged to ensure that the input impedance of the receiver is at least 2 kΩ.

3. The radar level gauge according to claim 1, wherein said delay is at least 10% greater than said pulse duration.

4. The radar level gauge according to claim 1, wherein said pulse duration is approximately 1.5 ns or less, and said delay is approximately 1.7 ns or more.

5. The radar level gauge according to claim 1, wherein said impedance increasing circuitry includes one or more emitter follower.

6. The radar level gauge according to claim 1, further comprising signal/power circuitry configured to receive operating power and communicate measurement data.

7. The radar level gauge according to claim 1, wherein said pulse duration is in the order of ns, and said Tx frequency is in the order of MHz.

8. The radar level gauge according to claim 1, wherein said pulse generator is configured to generate pulses with adjustable pulse duration, and wherein said processing circuitry is configured to determine a width of the transmitted pulse and apply feedback control of said adjustable pulse duration.

9. The radar level gauge according to claim 8, wherein a setpoint value of said feedback control is determined based on one or several measured environmental parameters.

10. The radar level gauge according to claim 1, wherein said receiver is a differential receiver, having a first terminal connected to said propagation device, and a second terminal connected to ground potential, a voltage between said first and second terminals forming an input signal to said differential receiver.

11. The radar level gauge according to claim 10, wherein the impedance increasing circuitry includes:
    a first impedance increasing circuit connected to increase an input impedance of the first terminal, and
    a second impedance increasing circuit connected to increase an input impedance of the second terminal.

12. The radar level gauge according to claim 1, wherein said receiver is a common mode receiver, having a terminal connected to said propagation device.

13. The radar level gauge according to claim 12, wherein the impedance increasing circuitry includes an impedance increasing circuit connected to increase an input impedance of the terminal.

14. The level gauge according to claim 1, wherein said propagation device is a transmission line probe extending into the tank and into the product, and wherein said reflection is caused by an impedance transition where the transmission line passes the surface.

15. The radar level gauge according to claim 14, further comprising:
    a housing providing explosion proof protection, and being electrically connected to a housing ground potential,
    an explosion proof first signal passage in said housing wall, said first signal passage configured to be connected to an external power supply,
    an explosion proof second signal passage in said housing wall, said second signal passage providing an intrinsically safe, IS, output connected to said transmission line probe,
    a resistor having a first terminal connected to the IS output and a second terminal connected to the housing ground potential, wherein said housing encloses:
- radar level gauge (RLG) circuitry including said frequency generator and said processing circuitry, and
- a microwave unit including said pulse generator, said receiver, and said sampling circuitry,
- said RLG circuitry and said microwave unit having a floating ground potential which is independent from said housing ground potential, and
- a set of blocking capacitors connected between the microwave unit and the IS output, which blocking capacitors serve to block any DC components.

16. The radar level gauge according to claim 15, wherein the pulse generator has a first terminal connected to said IS output via said set of blocking capacitors, and a second terminal connected to said housing ground potential via said set of blocking capacitors, and
- wherein said receiver is a differential receiver, having a first terminal connected to said IS output via said set of blocking capacitors, and a second terminal connected to said housing ground potential via said set of blocking capacitors, a voltage between said first and second terminals forming an input signal to said differential receiver.

17. The radar level gauge according to claim 15, wherein said RLG circuitry is incompatible with intrinsic safety requirements, and further comprising an electrical barrier connected between the RLG circuitry and the microwave unit, said electrical barrier preventing energy or voltages incompatible with IS requirements from reaching said microwave unit.

18. The radar level gauge according to claim 17, wherein said RLG circuitry includes at least one energy store having an energy storage capacity which is incompatible with IS requirements at a voltage applied to the energy store.

19. The level gauge according to claim 1, wherein said propagation device is a directional antenna directed towards the surface.

20. The radar level gauge according to claim 1, wherein said impedance increasing circuitry is arranged to ensure that the input impedance of the receiver is 10 kOhm.

* * * * *